United States Patent
Stacy

(10) Patent No.: US 6,571,825 B2
(45) Date of Patent: Jun. 3, 2003

(54) ROTARY VALVE

(76) Inventor: Peter Charles Stacy, 120 Ameysford Road, Ferndown, Dorset BH22 9QE (GB)

( * ) Notice: Subject to any disclaimer, the term of this patent is extended or adjusted under 35 U.S.C. 154(b) by 0 days.

(21) Appl. No.: 09/866,522

(22) Filed: May 25, 2001

(65) Prior Publication Data

US 2002/0121307 A1 Sep. 5, 2002

Related U.S. Application Data

(63) Continuation of application No. PCT/GB99/03937, filed on Nov. 25, 1999.

(51) Int. Cl.$^7$ .............................................. F16K 11/02
(52) U.S. Cl. ...................... 137/624.13; 5/713; 137/887
(58) Field of Search ................ 137/624.13, 624.15, 137/887; 5/713

(56) References Cited

U.S. PATENT DOCUMENTS 5,189,742 A * 3/1993 Schild ........................... 5/453
5,676,639 A * 10/1997 Schild ......................... 601/151
6,058,538 A * 5/2000 Chapman et al. .............. 5/713

FOREIGN PATENT DOCUMENTS

GB          2243475        * 10/1991

* cited by examiner

*Primary Examiner*—Kevin Lee

(57) ABSTRACT

A rotary valve for use in controlling an air supply to an inflatable patient support system, especially an alternating pressure mattress. The rotary valve comprises a body member having a planar surface and at least two apertures for communication with cells or sets of cells in the patient support system. A further aperture is provided for connection to a pressurized air source and an actuator member is rotatable in face to face contact with the planar surface. The actuator has a recessed portion which forms an air supply chamber when in contact with the planar surface. The valve further comprises a drive for rotating the actuator with respect to the first member and a detector for detecting the position of the actuator relative to the body member and, in conjunction with a control for controlling the timing and duration of air supply to the cells or sets of cells.

12 Claims, 3 Drawing Sheets

ROTARY VALVE

RELATED APPLICATIONS

This application is a continuation under 35 USC §120 of co-pending PCT international application Serial No. PCT/GB99/03937 filed on Nov. 25, 1999 and designating the United States, which claims priority to Great Britain patent application No. 9826133.2 filed Nov. 27, 1998. By this reference, the full disclosure of PCT international application No. PCT/GB99/03937 is incorporated herein as though now set forth in its entirety.

FIELD OF THE INVENTION

This invention relates to rotary valves and, in particular, to rotary valves for use in controlling an air supply to alternating pressure patient support systems.

BACKGROUND OF THE INVENTION

Alternating pressure mattresses are commonly used for prevention and treatment of pressure sores and alternating pressure pads have been used in other patient support equipment, such as wheelchair cushions. Alternating pressure systems are linked to a pump or other source of air pressure via a control system which alternately inflates and deflates different cells or sets of cells within the patient support structure. The variation in interface pressure between the patient's skin and the mattress reduces the incidence of pressure sores.

Two methods have been used to distribute air to and from the mattress cells in order to produce the alternating pressure effect. These are rotary valves and multiple solenoid valves. Rotary valves which have been used in the past have included an actuator plate continuously rotating against a valve face. The actuator plate is formed with slots and holes which periodically align with holes in the valve face, thus opening and closing air ports. The cycle time is governed by the speed at which the actuator rotates across the valve face and the timing of each opening and closing event is determined by the positions and dimensions of slots and holes in the valve assembly and the speed of rotation.

Although rotary valves of this type are relatively inexpensive, simple and reliable, they have the disadvantage that continuous operation of the motor increases power consumption and the timing of the opening and closing events within one cycle is fixed.

The second method of controlling alternating pressure mattresses and other support systems are solenoid valves. Although solenoid valves can be readily controlled by a micro-processor, they have the disadvantages that they are relatively expensive and give limited flow rate so that large capacity valves are required. They are also relatively noisy, tend to be unreliable in use and have a high power consumption.

SUMMARY OF THE INVENTION

The present invention provides an improved rotary valve system which combines most of the advantages of conventional rotary and solenoid valves.

According to one aspect of the present invention, there is provided a rotary valve for controlling air supply to an alternating pressure patient support system which comprises a body member having a planar surface and at least two apertures for communication with cells and/or sets of cells in the patient support system, and a further aperture for connection to a pressurized air source, and actuator member which is rotatable in face to face contact with said planar surface, said actuator having a recessed portion which forms an air supply chamber when in contact with said planar surface and is positioned to be constantly supplied with air from said further aperture, drive means for rotating the actuator with respect to the first member and detector means for detecting the position of the actuator relative to the body member, and in conjunction with control means, for controlling the timing and duration of air supply to the cells or sets of cells.

Preferably, the actuator also includes an aperture through which air can be exhausted in turn from one or other of the cells or sets of cells.

The detector preferably comprises at least one optical sensor mounted in the vicinity of the actuator and arranged to detect the position of the actuator relative to the body member. In one embodiment, the sensor interacts with apertures or slots in the actuator which are conveniently located around the perimeter.

Preferably, the drive means is capable of rotating the actuator in both directions and this gives greater flexibility to the sequence of events, timing and duration of air supply to the cells.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
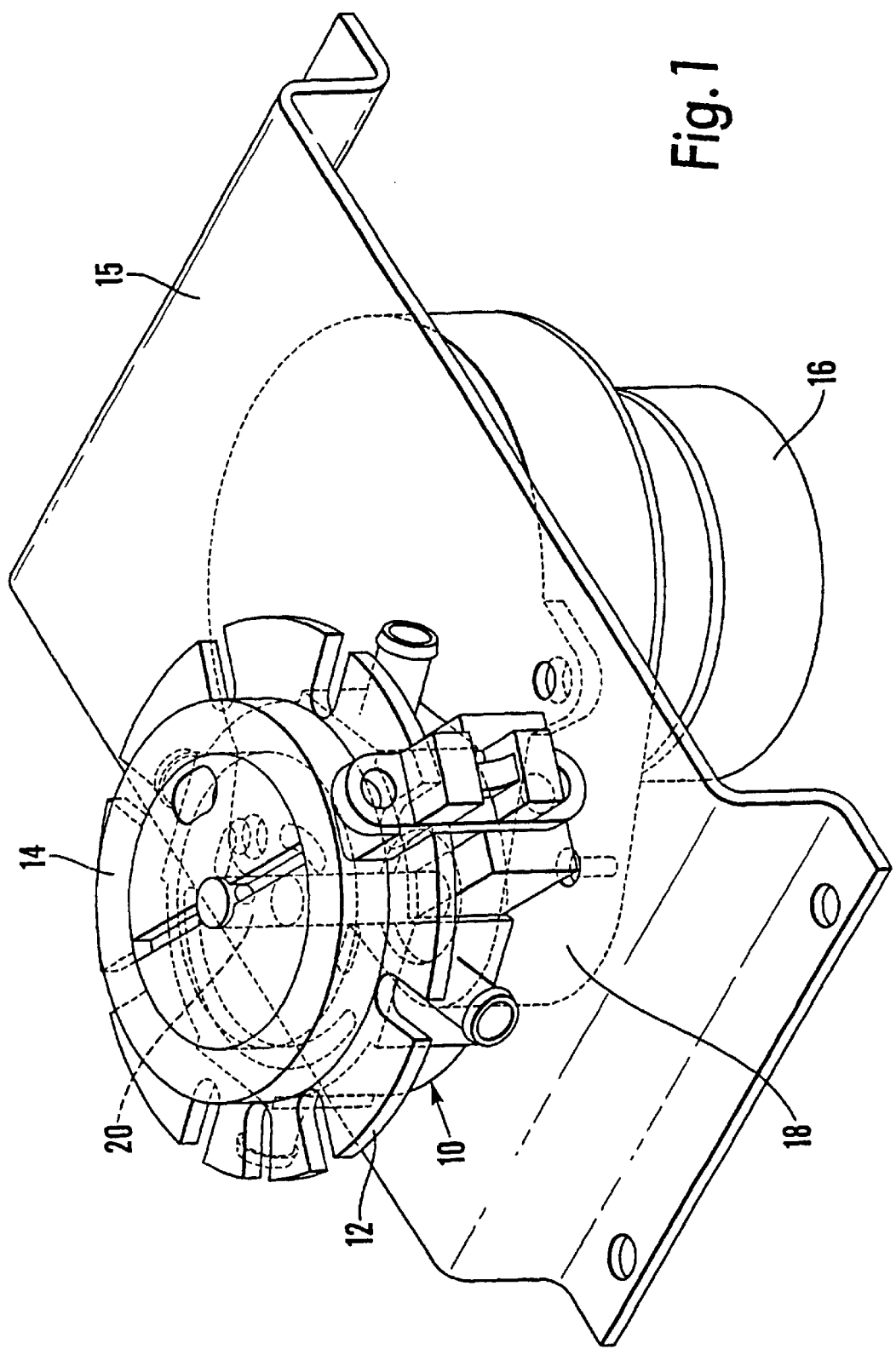
FIG. 1 is a perspective view of the assembled valve.

Referring to the drawings, the rotary valve comprises a body member 10 and a rotary actuator 12. The valve is mounted as shown in FIG. 1 on a plate 15, beneath which is located a two directional drive comprising a motor 16 and a gearbox 18. The gearbox 18 incorporates a drive spindle 20 which extends through the valve body member 10 and is engageable with the actuator plate 12, to rotate the plate relative to the valve body. A spring is provided (not shown) to press the valve body and actuator together.

Figure 3:
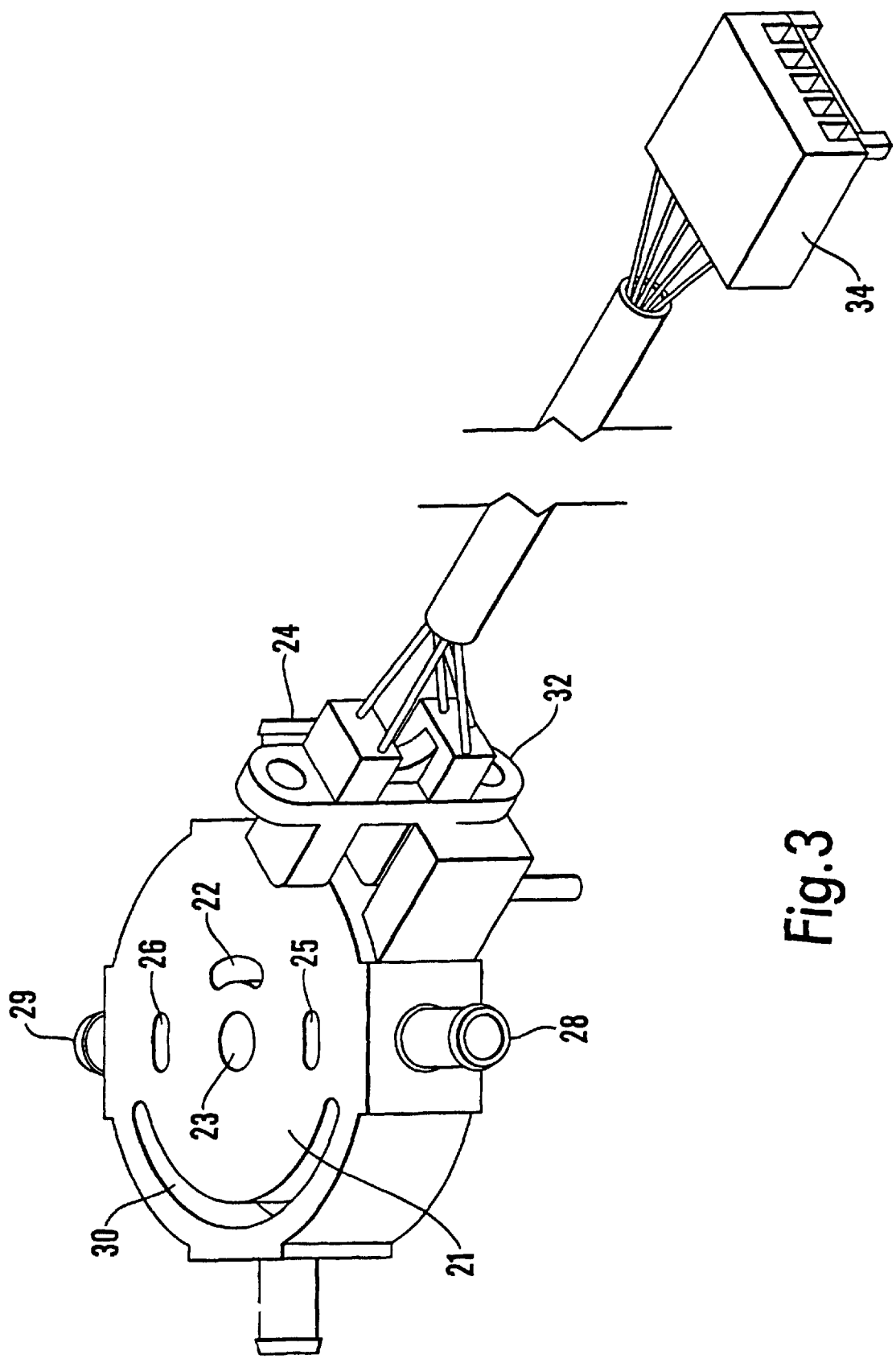
FIG. 3 is a perspective view of the valve body member.

The valve member is shown best in FIG. 3 and it will be seen that the member comprises a planar face 21, having a central opening 23 for the drive shaft for the actuator plate and an aperture 22 for admission of pressurized air from a pump. The pump is not shown in the drawings, but would be connected to an air inlet 24 in one side of the body member. The planar surface 21 incorporates two diametrically opposed apertures 25 and 26, which are connected respectively to outlet ports 28 and 29 for connection to the first and second set of cells. The planar surface 21 also includes an arcuate slot 30 which can be arranged to supply other functions of the bed but, in this case, is not used.

Also shown in FIG. 3 is an optical switch and receptor 32 which is connected to a connector pin 34, for linkage to a micro-processor.

Figure 2:
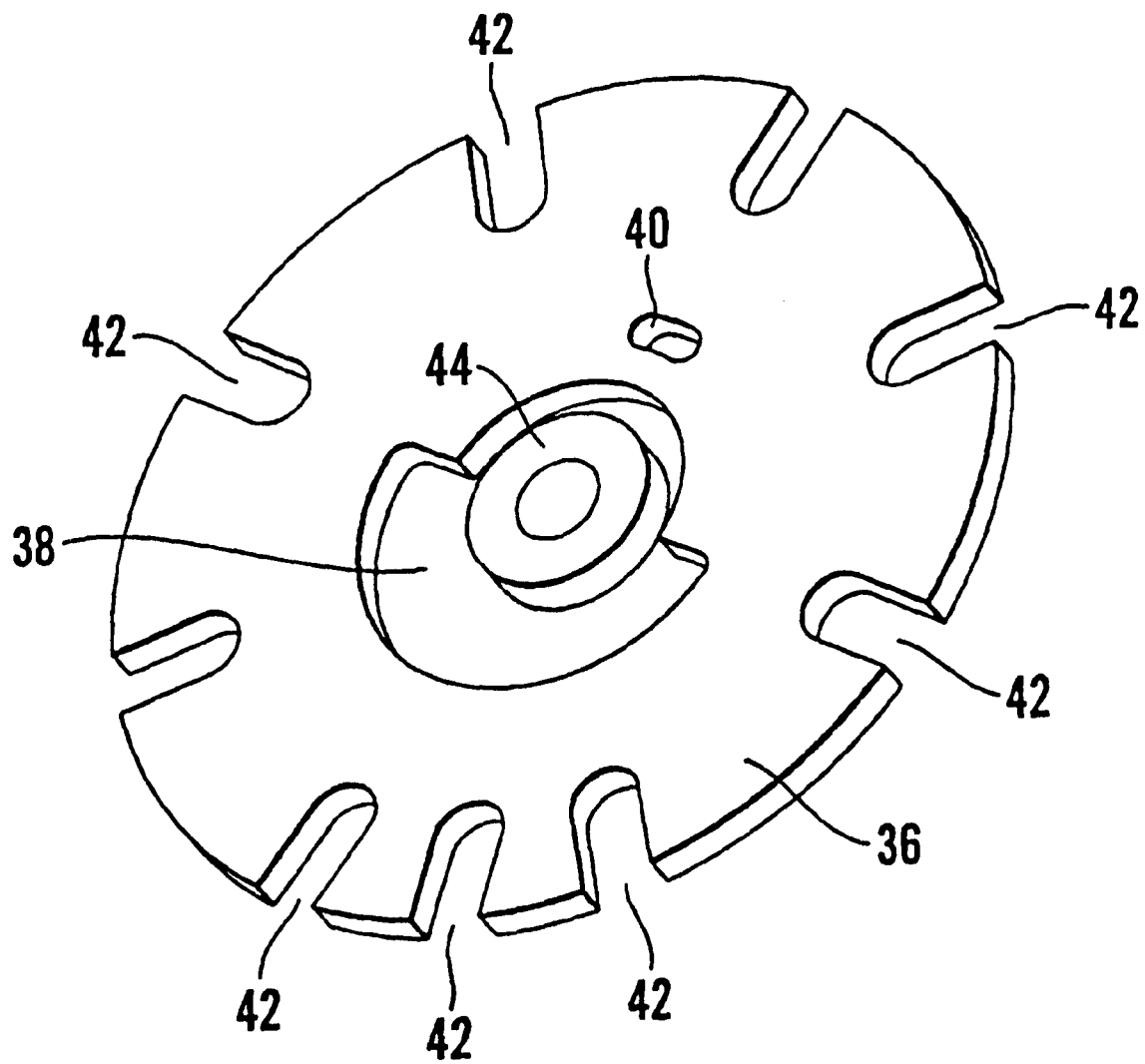
FIG. 2 is a perspective view of the actuator plate.

FIG. 2 shows the actuator plate looking at the face 36 which is intended to be placed in face to face contact with the planar surface 21. Actuator plate 12 may be machined, e.g. from metal or plastic, or manufactured as a molding. The actuator plate incorporates a recess 38 which forms a supply chamber for air to the valve. The plate also includes the port 40 for exhausting air from the two sets of cells.

Around the perimeter of the actuator plate is provided a series of indexing slots 42. As can be seen from the drawing, there are nine slots arranged at varying intervals around the perimeter.

In operation, the actuator face 36 is in contact with the valve face 21, and is driven by the motor and gearbox 16, 18 in one or other direction under the control of the microprocessor (not shown). The drive to the plate is arranged through the hub 44.

In use, the aperture 22 is always in communication with the supply chamber 38. By virtue of the shape of the chamber and the position of the actuator plate on the valve face, air is supplied to one or other or both of the sets of valves. The apertures or slots 42 in the perimeter of the actuator face interact with the optical switch 32, in order that the control means can detect the position and hence the operating position of the actuator plate in the valve.

The slots 42 around the perimeter of the actuator plate each correspond with an index point which represents a particular status with regard to the two groups of cells. The various index point positions are shown below.

| Index Point | Cell A | Cell B |
| --- | --- | --- |
| 1 | Fill | Fill |
| 2 | Fill | Hold inflated |
| 3 | Fill | Exhaust |
| 4 | Fill | Hold deflated |
| 5 | Fill | Fill |
| 6 | Hold inflated | Fill |
| 7 | Exhaust | Fill |
| 8 | Hold deflated | Fill |

It will be seen that eight positions are listed above but that there are now slots in the actuator perimeter. This extra slot is needed for the operating software to find the home position at the start up of the apparatus. Thus, when initially switching on the equipment, the valve has lost orientation and the control device therefore rotates the actuator until the optical switch sees three slots in close proximity. At the third slot, it is able to recognize this position as index point 1 and, in further operation of the equipment, this extra slot is no longer used.

The valve described above can be used in conjunction with any type of alternating pressure support system, one example being the mattress described in U.S. Pat. No. 5,396,671.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. In any case, because the scope of the present invention is much broader than any particular embodiment, the foregoing detailed description should not be construed as a limitation of the scope of the present invention, which is limited only by the claims appended hereto.

What is claimed is:

1. A rotary valve for controlling air supply to an alternating pressure patient support system which comprises of body member having a planar surface and at least two apertures for communication with cells or sets of cells in the patient support system, and a further aperture for connection to a pressurized air source, an actuator member which is rotatable in face to face contact with said planar surface, said actuator member having a recessed portion which forms an air supply chamber when in contact with said planar surface and is positioned to be constantly supplied with air from said further aperture, drive means for rotating the actuator member with respect to the body member and detector means for detecting the position of the actuator relative to the body member and, in conjunction with control means, for controlling the timing and duration of air supply to the cells or sets of cells, wherein the drive means are capable of rotating the actuator in either of two directions.

2. A rotary valve for controlling air supply to a patient support system, said rotary valve comprising:

a valve body having a planar surface, said valve body comprising an air inlet and at least two air outlets;

an actuator plate in face-to-face contact with said planar surface and rotatable with respect to said valve body, said actuator plate comprising a recessed portion positioned to be constantly supplied with air from said inlet aperture;

a drive mechanism for rotating said actuator plate with respect to said valve body; and a drive controller for controlling rotation of said actuator plate by said drive mechanism.

3. The rotary valve as recited in claim 2, wherein said drive controller comprises a position sensor for determining the position of said actuator plate with respect to said valve body.

4. The rotary valve as recited in claim 3, wherein said position sensor comprises an optical sensor.

5. The rotate valve as recited in claim 4, wherein:

said actuator plate comprises a plurality of perimetrically positioned apertures; and said optical sensor is adapted to interact with said perimetrically positioned apertures for determining the position of said actuator plate with respect to said valve body.

6. The rotary valve as recited in claim 4, wherein:

said actuator plate comprises a plurality of perimetrically positioned slots; and said optical sensor is adapted to interact with said perimetrically positioned slots for determining the position of said actuator plate with respect to said valve body.

7. The rotary valve as recited in claim 2, wherein said drive mechanism is adapted to rotate said actuator plate in either of two directions with respect to said valve body.

8. The rotary valve as recited in claim 2, wherein said drive mechanism comprises a motor.

9. The rotary valve as recited in claim 8, where said drive mechanism further comprises a gearbox.

10. The rotary valve as recited in claim 2, wherein said actuator plate further comprises an exhaust port for selectively enabling the exhaust from said rotary valve of air from said air outlets.

11. The rotary valve as recited in claim 2, wherein said controller is adapted to alternately supply air from said air inlet to a first cell in the patient support system in communication with a first said air outlet and to a second cell in the patient support system in communication with a second said air outlet.

12. The rotary valve as recited in claim 2, wherein said controller is adapted to alternately supply air from said air inlet to a first set of cells in the patient support system in communication with a first said air outlet and to a second set of cells in the patient support system in communication with a second said air outlet.

* * * * *